May 29, 1934.  C. R. LAUBENFELS  1,960,819
WEED DESTROYER
Filed July 5, 1932
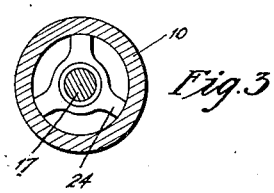
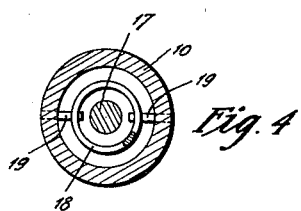
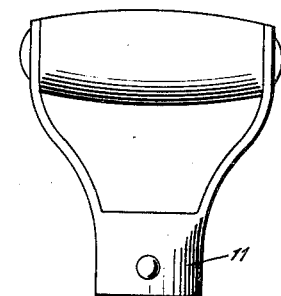
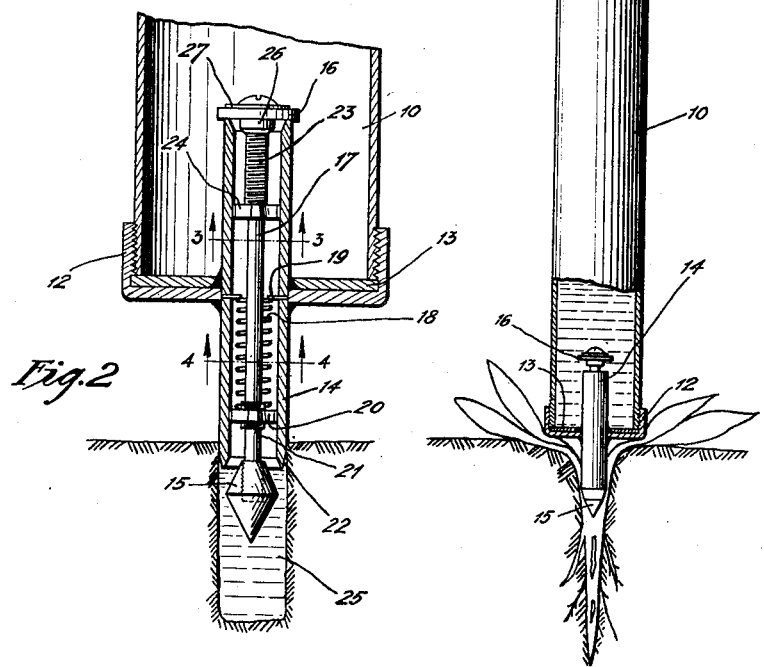
Inventor
Clarence R. Laubenfels
by Orwig & Hague Attys Patented May 29, 1934

1,960,819

UNITED STATES PATENT OFFICE 1,960,819

WEED DESTROYER

Clarence R. Laubenfels, Burlington, Iowa

Application July 5, 1932, Serial No. 620,850

3 Claims. (Cl. 47—49)

This invention relates to improvements in weed destroying apparatus.

It is a well known fact that if certain kinds of chemicals in the form of fluids are delivered to the roots of plants to be destroyed, at a point below the ground surface, that the plants will be completely destroyed without further effort on the part of the operator. The main difficulty in this method of destroying weeds consists in providing a cheap apparatus which may be easily and efficiently operated.

It is, therefore, the object of my invention to provide a simple, durable and inexpensive tool for easily and quickly applying fluid compounds to the crowns or roots of plants at a point below the ground surface in sufficient quantities to kill the plants.

More specifically it is the object of my invention to provide a tool which may be easily carried and operated, in which is provided a container for carrying a considerable amount of liquid for the purpose above stated, and provided with means for piercing the ground surface adjacent to the root or crown of the plant being destroyed, and in connection therewith means for automatically delivering to said roots measured quantities of liquid, all being accomplished in a single operation.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of my improved weed destroyer illustrating the manner in which the ground surface adjacent to the plant is pierced thereby, the lower end of the container being broken away to illustrate the interior construction.

Figure 2 is an enlarged detail sectional view of the lower end of the weed destroyer illustrating the manner in which fluid is emptied from the container into the cavity formed by the piercing apparatus.

Figure 3 is a detail sectional view taken on the line 3—3 of Figure 2.

Figure 4 is a detail sectional view taken on the line 4—4 of Figure 2.

Referring to the accompanying drawing, I have used the reference numeral 10 to indicate the body of the weed destroyer which is preferably in the form of a tube having its upper end closed and provided with a handle 11. The lower end of the tube 10 has a cap 12 threaded thereon. A packing 13 is mounted between the cap and the end of the tube.

Supported in the center of the cap 12 is a short pipe or tube 14 having one end projecting upwardly into the container formed in the tube 10, and its opposite end projecting downwardly from the cap a slight distance. The tube 14 is sealed in the cap 12 to form a tight connection between the tube and said cap.

The lower edge of the tube 14 is beveled to receive a conical valve 15. The lower end of the valve 15 is in the form of an inverted cone to provide a point for the lower end of the tube 14 when the valve is in a closed position. A valve 16 is provided for closing the upper end of the tube 14, said valves being connected by means of a rod 17, the length of which is such that when the valve 16 is in a closed position, the valve 15 is in an open position, as illustrated in Figure 2, or if the valve 15 is moved to a closed position, then the valve 16 will be moved to an open position as illustrated in Figure 1.

For yieldably holding the valve 16 in a closed position I have provided a spring 18, the upper end of which rests against inwardly projecting pins 19 and the tube 14.

The lower end of the spring 15 is mounted on a spider 20 threaded on the lower portion of the rod 17, at a point above the upper end of the valve 15, so that a space 21 is provided between the spider and the lower end of the valve to permit fluid to flow more readily from the tube through the space between the valve 15 and the seat 22, formed by the beveled lower edge of the tube 14.

The upper end of the rod 17 is provided with a threaded portion 23 on which a spider 24 is mounted. Said spider 24 acts as a guide for the upper end of the rod.

The practical operation of my device is as follows:

Assuming that the tube or container 10 has been filled with fluid suitable for the destruction of weeds, such for instance as dandelions, and that the cap 12 has been placed in position, the valve 16 will be automatically closed by the spring 18 to prevent fluid from flowing out of the container, the operator then places the pointed end of the valve 15 on the ground surface immediately above the crown or root and then applies a downward pressure on the handle 11, causing the valve 15 to be moved to a closed position and the valve 16 opened. Fluid will then flow from the container 10 into the interior of the tube 14. Further downward pressure on the handle 11 will cause the outwardly projecting end of the tube 14 to enter the ground surface in the manner illustrated in Figure 1 to a distance of about an inch and a half until the cap 12 engages the ground surface.

The handle 11 is then lifted, together with the container 10, so that a cavity 25 is formed in the ground surface adjacent to the root of the plant being treated. As the handle is moved upwardly, the spring 18 will close the valve 16 and at the same time open the valve 15, permitting the fluid to flow outwardly through the space between the valve 15 and the seat 22 into the cavity 25.

It will be seen that as the fluid is delivered to the cavity 25, it will flow downwardly over the valve 15 and wash off any particles of grit or soil which might otherwise adhere thereto.

I have found by actual experiment that a considerable amount of space is necessary between the lower edge of the seat 22 and the lower edge of the valve 15, as otherwise fluid will be held in the space between the seat and said valve by capillary action and surface tension. As the fluid is emptied from the member 14, sufficient air is permitted to enter, which escapes upwardly through the tube each time the valve 15 is closed and the valve 16 opened to replace the fluid displaced. In this manner the container is always fluid tight so it may be handled either in a vertical or horizontal position without danger of leaking.

The tube 14 is of such length and width as to provide a measuring device for delivering each time the exact quantity necessary to completely destroy the root, thereby providing means whereby the fluid may be economically and easily delivered.

The piercing of the ground surface and the delivering of the fluid takes place in one operation so that a large number of plants may be treated in a comparatively small amount of time and at a low cost.

The tubular member 14 is mounted in the cap which is detached from the body 10, so that adjustment of the valves and the mechanism for actuating the same may be easily accomplished when necessary. The entire mechanism is dissembled by moving the valve 15, which is threaded to the lower end of the rod 17. The spider 20 is then removed, permitting the spring 14 to be taken from the tubular member. The valve 16 and the spider 24 are removed through the inner end of the tube.

The valve 16 is preferably of resilient material such as leather clamped between a nut 26 and a head 27. The nut 26 is mounted on the threaded portion 23.

Thus it will be seen that I have provided a weed destroyer of that type adapted to deliver fluids to the roots of weeds and similar plants, which is of simple and light construction, and which may be rapidly and efficiently operated.

I claim as my invention:

1. A weed destroying tool comprising a hollow cylindrical body closed at its top for containing fluid, a cap for detachably closing the open end of said body, said cap including a tube supported longitudinally of said body and having one end projecting outwardly therefrom, the outer end of said tube having an annular valve seat, a valve for said seat having substantially the form of a double cone with its bases adjacent, a rod mounted longitudinally through the center of said tube to support said valve and of such size as to provide a fluid chamber between the said rod and the walls of said tube, said fluid chamber being of such size as to permit fluid to flow freely from the chamber when the valve is open, a second valve on the inner end of said rod for closing the inner end of said tube when the outer valve is open, and means for yieldably moving the inner valve to a closed position and the outer valve to an open position.

2. A weed destroying tool comprising a hollow body for containing fluid and having its lower end closed, said lower end including a tube supported longitudinally of said body and having one end projecting outwardly therefrom and its other end extending upwardly into said body, a valve for closing the lower end of said tube, said valve having its lower end pointed, a valve for closing the inner end of said tube, a rod mounted longitudinally through the center of said tube to operatively connect said valves, said rod being of such size as to provide a fluid chamber between said rod and the side walls of said tube, said tube being of such size as to form a measuring chamber and to permit fluid to flow freely from the interior of said body, and means for yieldably moving the inner valve to a closed position and the outer valve to an open position.

3. A weed destroying tool comprising a hollow body for containing fluid and having its lower end closed, said lower end including a tube supported longitudinally of said body and having one end projecting outwardly therefrom, the other end of said tube extending into said body, a valve for closing the lower end of said tube, said valve having its lower end pointed, a valve for closing the inner end of said tube, a rod mounted longitudinally through the center of said tube to connect said valves, pins projecting inwardly from the central portion of said tube, a spider fixed to said rod near its upper end, a second spider fixed to said rod near its lower end, said spider being slidably mounted in said tube, a spring carried by said rod having one end resting on the second spider and its other end resting against said pins, whereby the inner valve will be yieldably held in a closed position and the outer valve to an open position.

CLARENCE R. LAUBENFELS.